(12) United States Patent
Wang et al.

(10) Patent No.: US 11,275,962 B2
(45) Date of Patent: Mar. 15, 2022

(54) METHOD OF CONTROLLING IMAGE ACQUISITION AND OTHER RELATED TOOLS

(71) Applicant: BEIJING TUSEN ZHITU TECHNOLOGY CO., LTD., Beijing (CN)

(72) Inventors: Ming Wang, Beijing (CN); Jie Sun, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 138 days.

(21) Appl. No.: 16/250,959

(22) Filed: Jan. 17, 2019

(65) Prior Publication Data
US 2019/0236393 A1    Aug. 1, 2019

(30) Foreign Application Priority Data
Jan. 26, 2018  (CN) .......................... 201810076488.4

(51) Int. Cl.
*G06K 9/32*    (2006.01)
*G06K 9/62*    (2006.01)
*G06K 9/20*    (2006.01)

(52) U.S. Cl.
CPC ........... *G06K 9/3233* (2013.01); *G06K 9/209* (2013.01); *G06K 9/6202* (2013.01)

(58) Field of Classification Search
CPC .... G06K 9/3233; G06K 9/209; G06K 9/6202; G06T 7/11
See application file for complete search history.

(56) References Cited

U.S. PATENT DOCUMENTS

2006/0002607 A1   1/2006 Boncyk et al.
2006/0045381 A1*  3/2006 Matsuo ................ H04N 19/152
                                                           382/276
(Continued)

FOREIGN PATENT DOCUMENTS

CN    101350923 A    1/2009
CN    101631251 A    1/2010
(Continued)

OTHER PUBLICATIONS

Chinese Application No. 201810076488.4, Office Action dated Nov. 29, 2019, pp. 1-21.
(Continued)

*Primary Examiner* — Yuwen Pan
*Assistant Examiner* — Umair Ahsan
(74) *Attorney, Agent, or Firm* — Paul Liu; Julie J. Muyco; Perkins Coie, LLP

(57) ABSTRACT

The present disclosure provides a method for image capturing, a method for image capturing control and associated apparatuses. The method for image capturing includes: obtaining Region Of Interest (ROI) information of a target ROI corresponding to a current frame of image; buffering captured pixel data of the current frame of image; obtaining, when determining that the pixel data of the current frame of image has been buffered completely, pixel data associated with the target ROI from the buffered pixel data of the current frame of image based on the ROI information if the ROI information of the target ROI corresponding to the current frame of image can be obtained; and outputting the pixel data associated with the target ROI.

6 Claims, 17 Drawing Sheets

(56) References Cited

U.S. PATENT DOCUMENTS

| | | | | |
|---|---|---|---|---|
| 2007/0120979 A1* | 5/2007 | Zhang | .................... | H04N 7/188 |
| | | | | 348/154 |
| 2011/0182526 A1 | 7/2011 | Yim et al. | | |
| 2017/0053167 A1* | 2/2017 | Ren | .......................... | G06T 3/40 |
| 2017/0061639 A1* | 3/2017 | Georgescu | ................ | G06T 7/11 |
| 2018/0121736 A1* | 5/2018 | Tsunashima | ....... | H04N 5/23206 |

FOREIGN PATENT DOCUMENTS

| | | | |
|---|---|---|---|
| CN | 101872483 A | 10/2010 | |
| CN | 102801962 A | 11/2012 | |
| CN | 104756135 A | 7/2015 | |
| CN | 106815287 A | 6/2017 | |

OTHER PUBLICATIONS

Chinese Application No. 201810076488.4, Supplementary Search dated Aug. 14, 2020, pp. 1.

* cited by examiner

METHOD OF CONTROLLING IMAGE ACQUISITION AND OTHER RELATED TOOLS

PRIORITY CLAIM AND RELATED APPLICATION

This U.S. patent document claims the priority of and the benefits of Chinese Patent Application No. 201810076488.4 of the same title and content that was filed by Applicant Beijing Tusen Weilai Technology Co., Ltd. at the State Intellectual Property Office of China (SIPO) on Jan. 26, 2018, which was published under the Publication No. 108307113 on Jul. 20, 2018.

TECHNICAL FIELD

The present disclosure relates to image capturing technology, and more particularly, to a method and an apparatus for image capturing, a method and an apparatus for image capturing control, a system for image capturing and a camera.

BACKGROUND

With the development of technical fields such as unmanned aerial vehicles, unmanned ships, self-driving, Virtual Reality (VR), three-dimensional (3D) scanning, robotic obstacle avoidance and Simultaneous Localization And Mapping (SLAM), cameras are widely used in these technical fields. Since these fields have high requirements on a camera' resolution, in the related art, a camera having high resolution (for example, 4096*4096) is typically used for capturing images. However, due to such high resolution, the amount of data to be transmitted by the camera is so large that the transmission speed of the image data is relatively slow. Accordingly, how to capture image data with high resolution while improving its transmission speed has become a technical problem to be solved by those skilled in the art.

In addition, in order to adapt image data outputted by a camera to human eyes, Image Signal Processing (ISP) is typically integrated in the camera, as shown in FIG. 1A, or provided separately from the camera, as shown in FIG. 1B. An image sensor of the camera transmits captured pixel data to the ISP for processing, and the ISP processes the pixel data before outputting it. However, in fact the ISP may lose some detail information in the pixel data when processing the pixel data. Hence, the image data processed by the ISP may still have a problem of information loss to some extent.

SUMMARY

According to embodiments of the present disclosure, a method for image capturing is provided. The method includes obtaining Region Of Interest (ROI) information of a target ROI corresponding to a current frame of image. The method also includes buffering captured pixel data of the current frame of image. The method also includes obtaining, when determining that the pixel data of the current frame of image has been buffered completely, pixel data associated with the target ROI from the buffered pixel data of the current frame of image based on the ROI information if the ROI information of the target ROI corresponding to the current frame of image can be obtained. The method also includes outputting the pixel data associated with the target ROI.

According to some embodiments of the present disclosure, a method for image capturing control is provided. The method includes predicting a position region in which a target object is to be located in a next frame of image based on an object tracking result associated with a previous frame of image, and determining the position region as a target ROI corresponding to the next frame of image. The method also includes transmitting ROI information of the target ROI corresponding to the next frame of image to a camera.

According to some embodiments of the present disclosure, a camera is provided. The camera includes an image sensor configured to capture pixel data of a current frame of image in accordance with a predetermined camera parameter and transmit the captured pixel data to an apparatus for image capturing. The camera also includes an apparatus for image capturing configured to obtain ROI information of a target ROI corresponding to the current frame of image; receive the pixel data of the current frame of image from the image sensor and buffer the pixel data; obtain, when determining that the pixel data of the current frame of image has been buffered completely, pixel data associated with the target ROI from the buffered pixel data of the current frame of image based on the ROI information if the ROI information of the target ROI corresponding to the current frame of image can be obtained; and output the pixel data associated with the target ROI.

According to some embodiments of the present disclosure, a system for image capturing is provided. The system includes an apparatus for image capturing control configured to predict a position region in which a target object is to be located in a next frame of image based on an object tracking result associated with a previous frame of image, and determine the position region as a target ROI corresponding to the next frame of image; and transmit ROI information of the target ROI corresponding to the next frame of image to a camera. The system also includes a camera configured to obtain ROI information of a target ROI corresponding to a current frame of image from the apparatus for image capturing control; capture pixel data of the current frame of image in accordance with a predetermined camera parameter and buffer the pixel data of the current frame of image; obtain, when determining that the pixel data of the current frame of image has been buffered completely, pixel data associated with the target ROI from the buffered pixel data of the current frame of image based on the ROI information if the ROI information of the target ROI corresponding to the current frame of image can be obtained; and output the pixel data associated with the target ROI.

DETAILED DESCRIPTION OF THE EMBODIMENTS

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The present disclosure provides a method and an apparatus for image capturing, a method and an apparatus for image capturing control, a system for image capturing and a camera, capable of solving the problem that the existing image capturing technique cannot achieve both high resolution and high transmission speed.

With the solutions according to the embodiments of the present disclosure, when a frame of image is captured, pixel data associated with the frame of image is buffered first. Then, pixel data associated with a target ROI corresponding to the frame of image may be obtained from the buffered pixel data of the frame of image based on ROI information of the target ROI and may be transmitted. That is, with the solutions according to the present disclosure, on one hand, pixel data may be captured with a high-resolution camera to obtain detail information of each piece of pixel data. On the other hand, when the image data is transmitted, instead of transmitting the pixel data of the entire frame of image, only pixel data associated with a target ROI, which is typically useful to a party requiring the image data, is transmitted. In this way, the amount of data to be transmitted may be reduced and thus the transmission speed of the image data may be increased. Furthermore, in the solutions according to the present disclosure, the pixel data captured by the camera does not need to be subjected to ISP and thus no detail information of the pixel data will be lost. As all the detail information of the pixel data may be reserved, the accuracy and integrity of the pixel data may be improved. As no ISP is required, the time required for ISP may be saved, which further increases the transmission speed of the image data. Therefore, with the solutions according to the present disclosure, the high-resolution image data may be provided to the party requiring the image data, while increasing the transmission speed of the image data, reserving all the detail information of the image data and improving the accuracy of the image data.

The solutions according to the embodiments of the present disclosure may be applied to an unmanned vehicle (including a truck, a public transportation bus, a bus, a passenger car, a tractor, a sprinkler, a garbage truck, etc.), an unmanned aerial vehicle, an unmanned ship, a robot or the like. The present disclosure is not limited to any specific application scenario of the technical solutions.

Embodiment 1

Figure 1A:
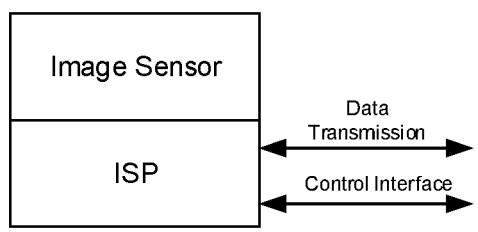
FIGS. 1A and 1B are schematic diagrams each showing a structure of a camera and ISP in the related art.
Figure 1B:
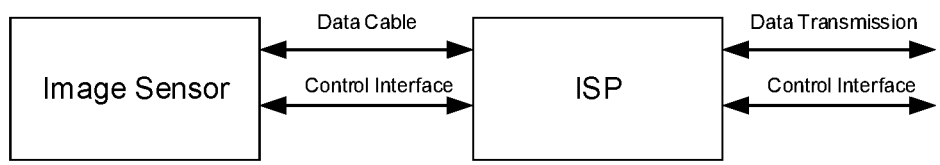
Figure 2:
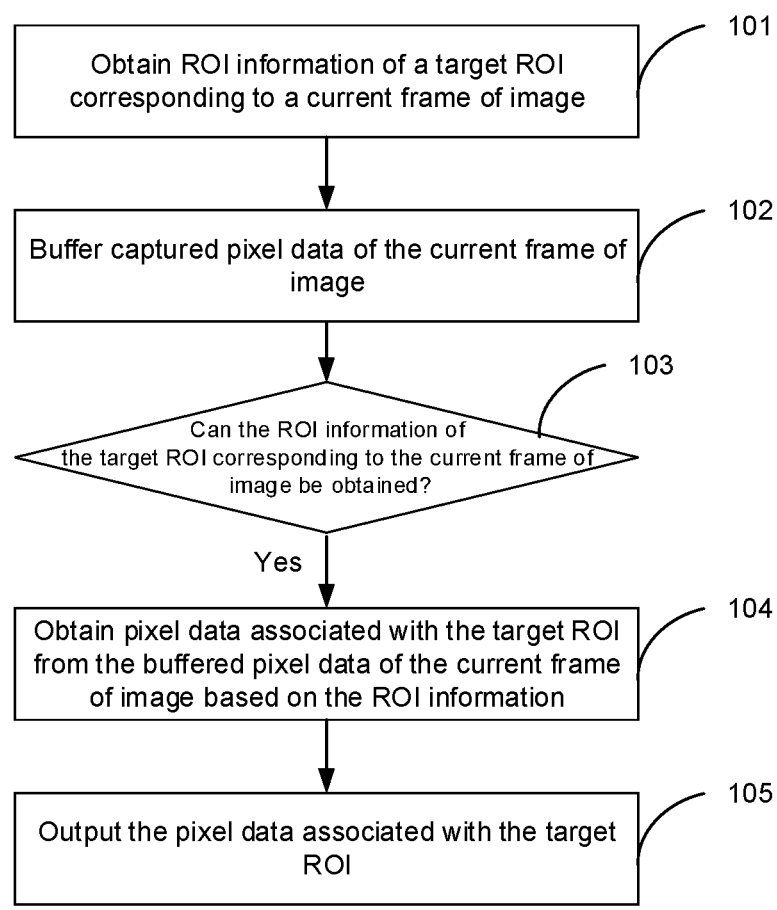
FIG. 2 is a flowchart illustrating a method for image capturing according to some embodiments of the present disclosure.

According to Embodiment 1 of the present disclosure, a method for image capturing is provided. The method is applicable to a camera. As shown in the flowchart of FIG. 2, the method includes the following steps.

At step 101, Region Of Interest (ROI) information of a target ROI corresponding to a current frame of image is obtained.

At step 102, captured pixel data of the current frame of image is buffered.

At step 103, when determining that the pixel data of the current frame of image has been buffered completely, it is determined whether the ROI information of the target ROI corresponding to the current frame of image may be obtained. If so, the method proceeds with step 104.

At step 104, pixel data associated with the target ROI is obtained from the buffered pixel data of the current frame of image based on the ROI information.

At step 105, the pixel data associated with the target ROI is outputted.

In Embodiment 1 of the present disclosure, the steps 101 and 102 are not necessarily performed in a particular order. For example, the step 101 may be performed before, after, or simultaneously with the step 102.

Assuming that a frame of image has a resolution of 4096*4096, the frame of image contains 4096 rows by 4096 columns of pixel data. In the step 103, as a non-limiting example, it may be determined whether the pixel data of the current frame of image has been buffered completely by 1) determining that the pixel data of the current frame of image has been buffered completely when a frame validity signal for the current frame of image ends; or 2) determining that the pixel data of the current frame of image has been buffered completely when 4096*4096 pieces of pixel data have been received in a valid period of the frame validity signal for the current frame of image.

Figure 3A:
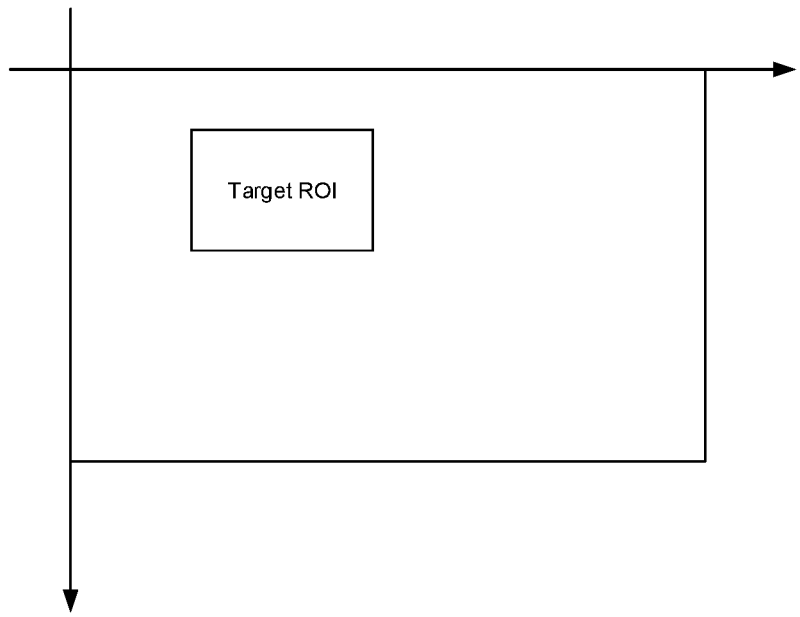
FIGS. 3A and 3B are schematic diagrams each showing a target ROI corresponding to a frame of image according to embodiments of the present disclosure.
Figure 3B:
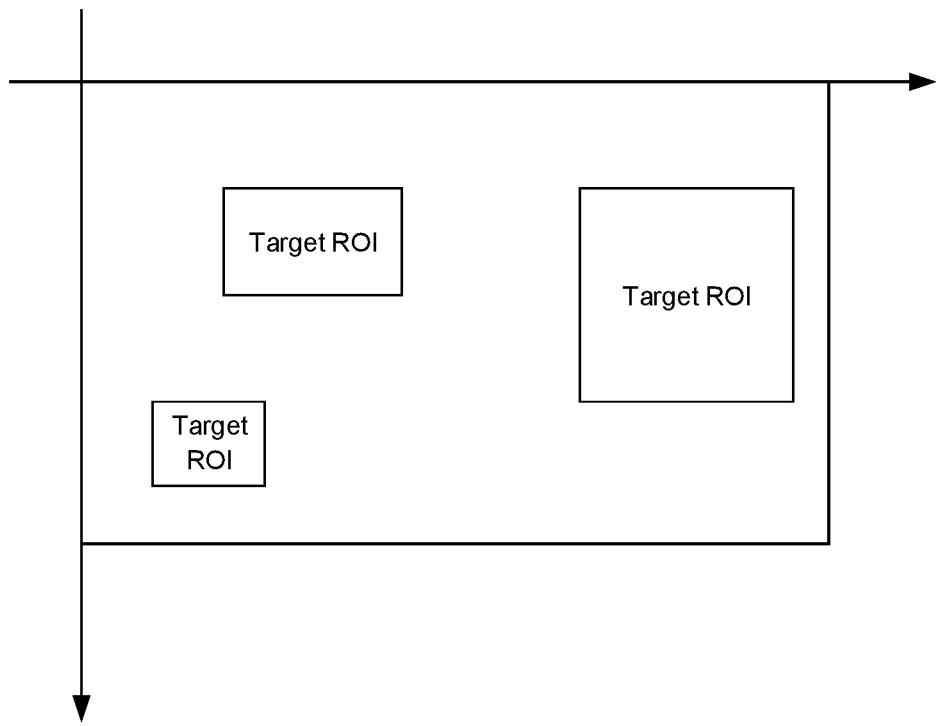

In some embodiments of the present disclosure, there may be one or more target ROIs corresponding to one frame of image. The number of target ROIs contained in each frame of image may or may not be the same. There is one target ROI corresponding to one frame of image, as shown in FIG. 3A, or three ROIs corresponding to one frame of image, as shown in FIG. 3B.

Figure 4:
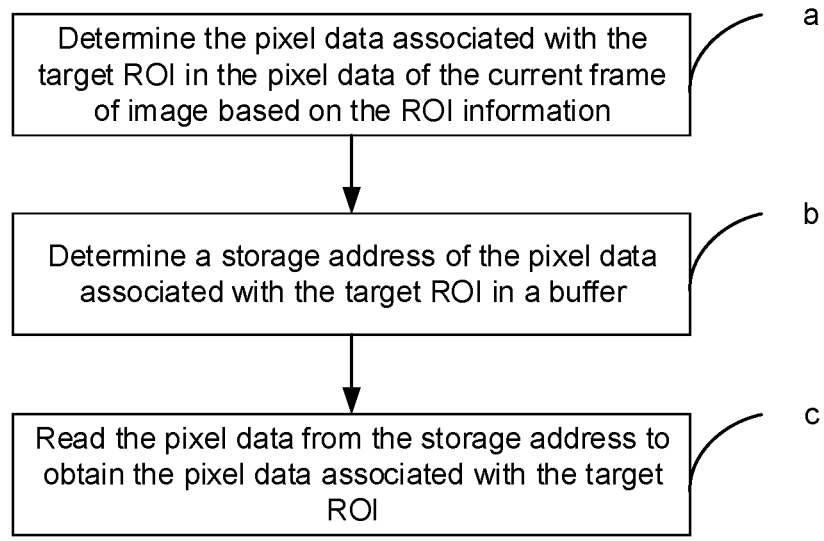
FIG. 4 is a flowchart showing a specific process for Step 103 according to some embodiments of the present disclosure.

In some embodiments, the step 104 of obtaining the pixel data associated with the target ROI from the buffered pixel data of the current frame of image based on the ROI information may be implemented according to the process shown in FIG. 4, which includes the following steps.

At step a, the pixel data associated with the target ROI in the pixel data of the current frame of image is determined based on the ROI information.

At step b, a storage address of the pixel data associated with the target ROI in a buffer is determined.

At step c, the pixel data is read from the storage address to obtain the pixel data associated with the target ROI.

Figure 5A:
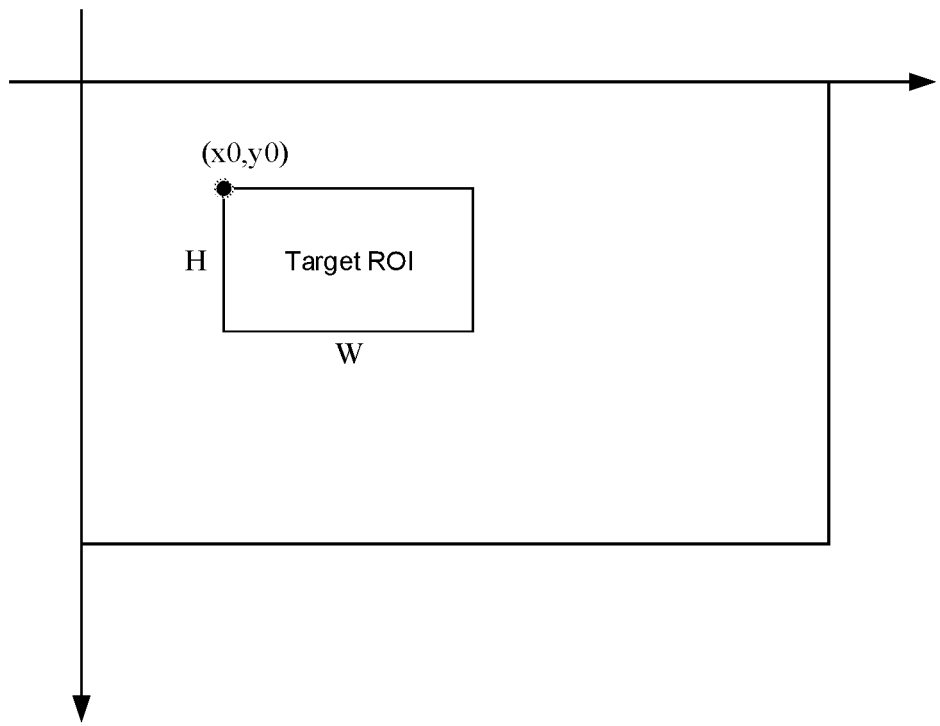
FIGS. 5A, 5B and 5C are schematic diagrams each showing a position region and ROI information corresponding to a target ROI.
Figure 5B:
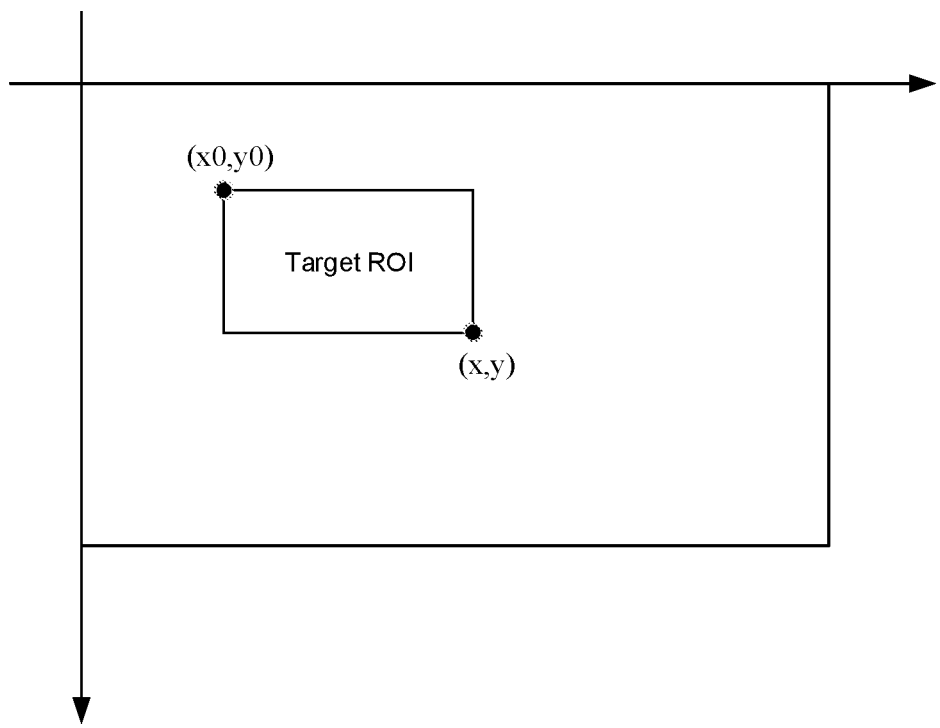
Figure 5C:
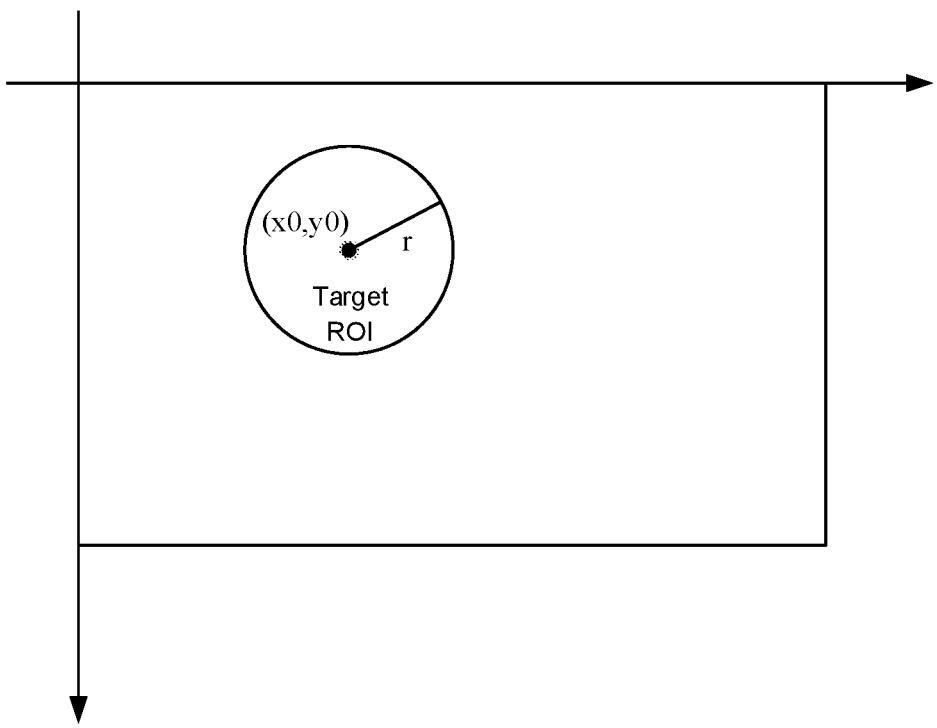

In some embodiments of the present disclosure, each target ROI for one frame of image may correspond to one piece of ROI information, or a plurality of target ROIs for one frame of image may correspond to one piece of ROI information. The ROI information contains information describing a position region of the target ROI in the frame of image. For example, assuming that the target ROI is a rectangle, the ROI information corresponding to the ROI may contain a position of a starting vertex (denoted as (x0, y0)), a width (denoted as W) and a height (denoted as H) of the rectangle, and the position region of the target ROI is shown in FIG. 5A. Alternatively, the ROI information corresponding to the ROI may contain a position of a starting vertex and a position of an end point (denoted as (x, y)) of the rectangle, and the position region of the target ROI is shown in FIG. 5B. The pixel data within the regions shown in FIGS. 5A and 5B, including the pixel data at the border of the regions, is the pixel data associated with the target ROI. As another example, assuming the target ROI is a circle, the ROI information corresponding to the ROI may contain a position of an origin (denoted as (x0, y0)) and a radius (denoted as r) of the circle, and the position region of the target ROI is shown in FIG. 5C. The pixel data within the region shown in FIG. 5C, including the pixel data at the border of the region, is determined as the pixel data associated with the target ROI. Of course, the shape of the position region of the target ROI may be other geometric shapes, e.g., a triangle, a square or an ellipse, to name a few.

In embodiments of the present disclosure, a fixed storage space may be allocated in advance for buffering the pixel data of one frame of image. The pixel of data of the current frame of image may be stored sequentially in the storage space in an outputting order. When the pixel data associated with the target ROI corresponding to the current frame of image has been outputted, the buffered pixel data of the current frame of image may be removed from the storage space, such that pixel data of the next frame of image may be buffered in the storage space.

In some embodiments of the present disclosure, pixel points in one frame of image may be indexed in advance and a correspondence between the indices and storage addresses at which pixel data corresponding to the respective indices is stored in the storage space may be established. In the step b, the storage addresses of the respective pieces of pixel data may be determined from the correspondence based on the indices of the respective pieces of pixel data associated with the target ROI.

Of course, it may be appreciated by those skilled in the art that the pixel data associated with the target ROI may be obtained from the storage space in alternative ways. For example, a storage address of starting pixel data of one frame of image and address offsets of other respective pixel points with respect to the starting pixel point may be stored in advance. When the pixel data associated with the target ROI is determined, the following steps may be performed for each piece of pixel data: moving a pointer from the storage address of the starting pixel data, as a starting address, to the storage address of that piece of pixel data by the address offset of that piece of pixel data with respect to the starting pixel data; and reading the pixel data at the storage address.

Figure 6:
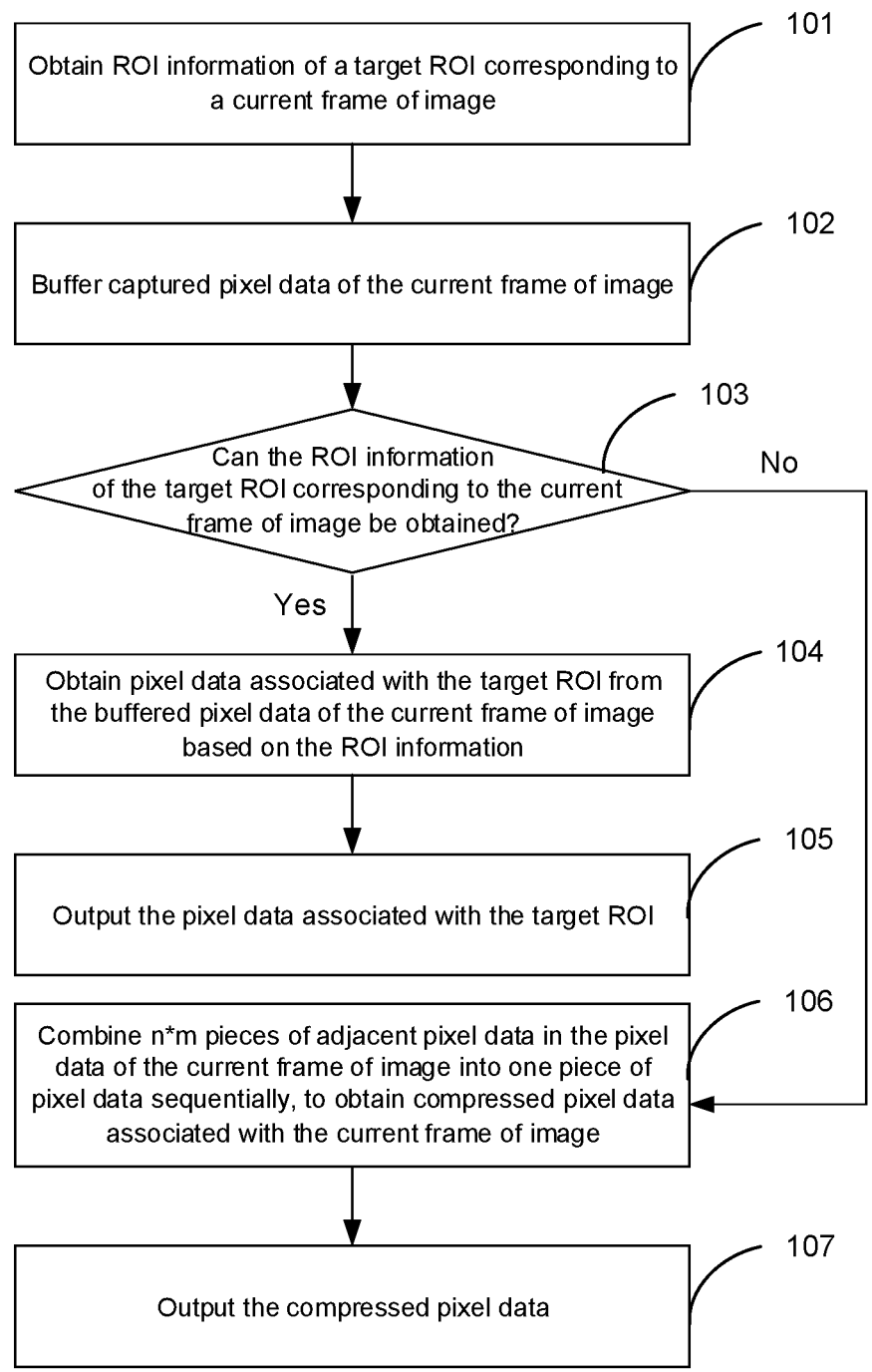
FIG. 6 is another flowchart illustrating a method for image capturing according to some embodiments of the present disclosure.

In practice, there may be a case where a certain frame of image does not have any ROI information of its corresponding target ROI. In order to transmit the image data of the frame of image successfully and increase the transmission speed of the image data of the frame of image, in an embodiment of the present disclosure, the above process shown in FIG. 2 may further include steps 106 and 107, as shown in FIG. 6.

The step 103 may further include: proceeding with step 106 otherwise.

At step 106, n*m pieces of adjacent pixel data in the pixel data of the current frame of image are combined into one piece of pixel data sequentially, to obtain compressed pixel data associated with the current frame of image, where n is a natural number divisible by a total number of rows in the current frame of image, and m is a natural number divisible by a total number of columns in the current frame of image.

At step 107, the compressed pixel data is outputted.

Figure 7A:
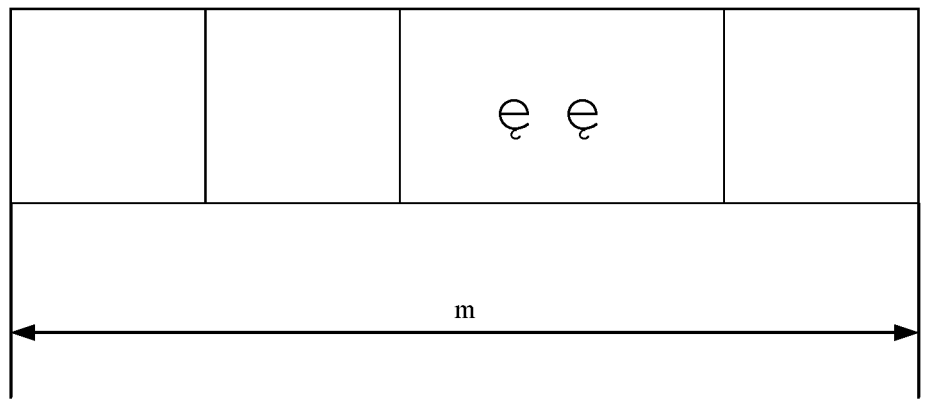
FIGS. 7A, 7B and 7C are schematic diagrams each showing n pieces of adjacent pixel data according to some embodiments of the present disclosure.
Figure 7B:
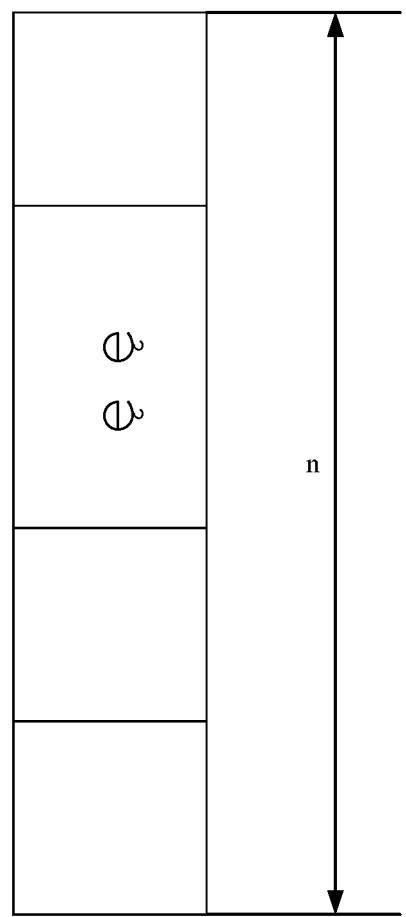
Figure 7C:
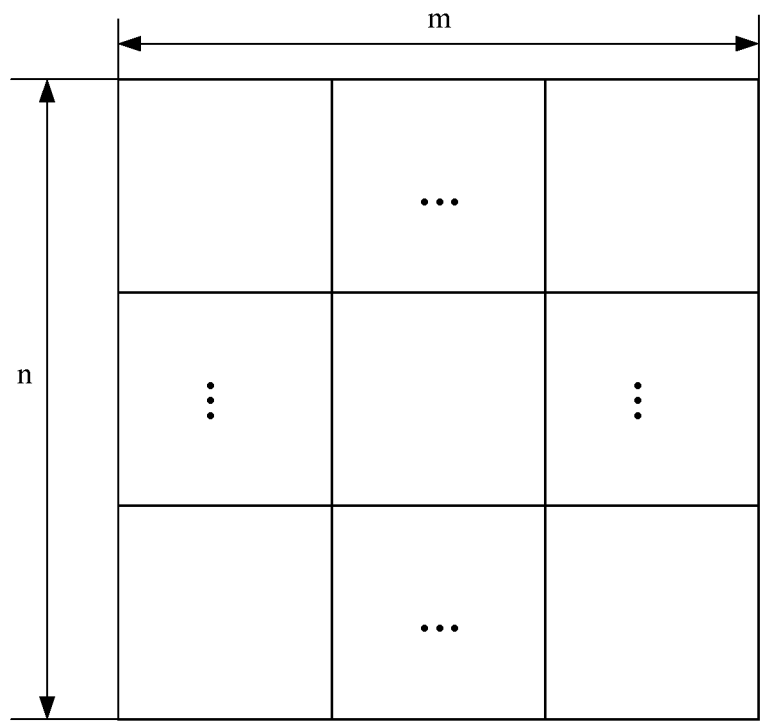

In some embodiments of the present disclosure, n may have a value of 1 and m may be a natural number having a value larger than 1. In this case, the n*m pieces of adjacent pixel data in the above step 106 may be m pieces of horizontally consecutive pixel data, as shown in FIG. 7A (where each square represents one piece of pixel data). In an embodiment of the present disclosure, m may have a value of 1 and n may be a natural number having a value larger than 1. In this case, the n*m pieces of adjacent pixel data in the above step 106 may be n pieces of vertically consecutive pixel data, as shown in FIG. 7B. In an embodiment of the present disclosure, each of n and m may be a natural number larger than 1 and the n*m pieces of adjacent pixel data in the above step 106 may constitute a rectangle or square, as shown in FIG. 7C. The values of n and m may be set by those skilled in the art as appropriate depending on actual requirements. The present disclosure is not limited to any specific values of n and m.

Figure 7D:
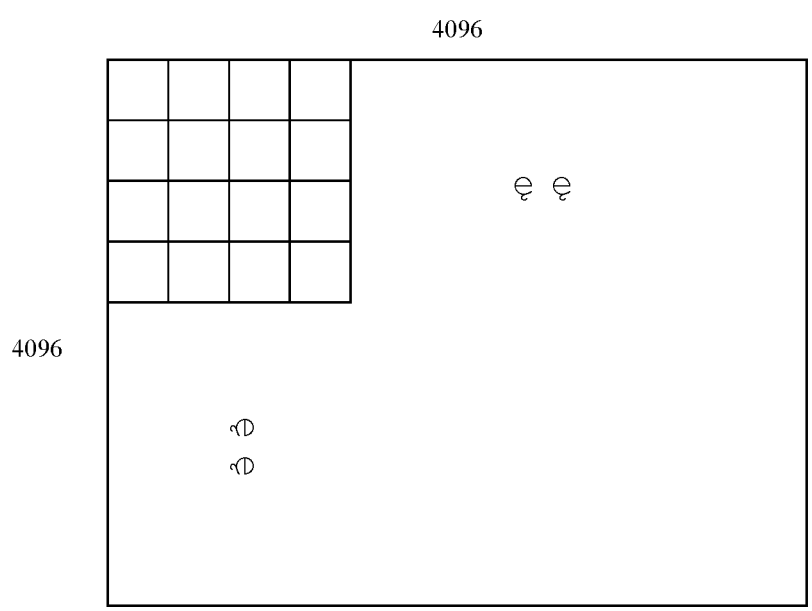
FIG. 7D is a schematic diagram showing a frame of image according to some embodiments of the present disclosure.
Figure 7E:
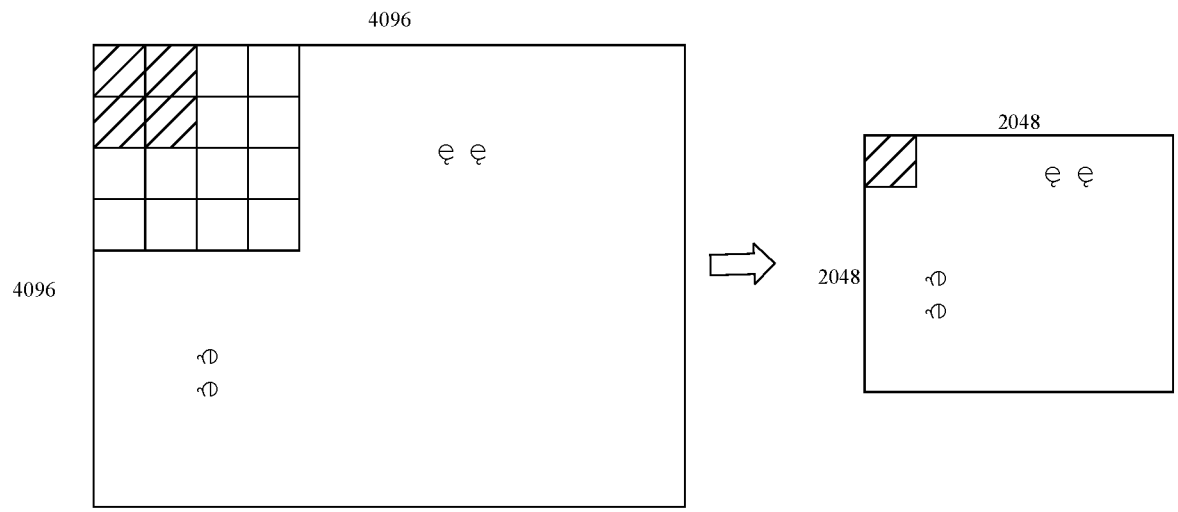
FIGS. 7E and 7F are schematic diagrams each showing combination of pixel data in the frame of image shown in FIG. 7D according to some embodiments of the present disclosure.
Figure 7F:
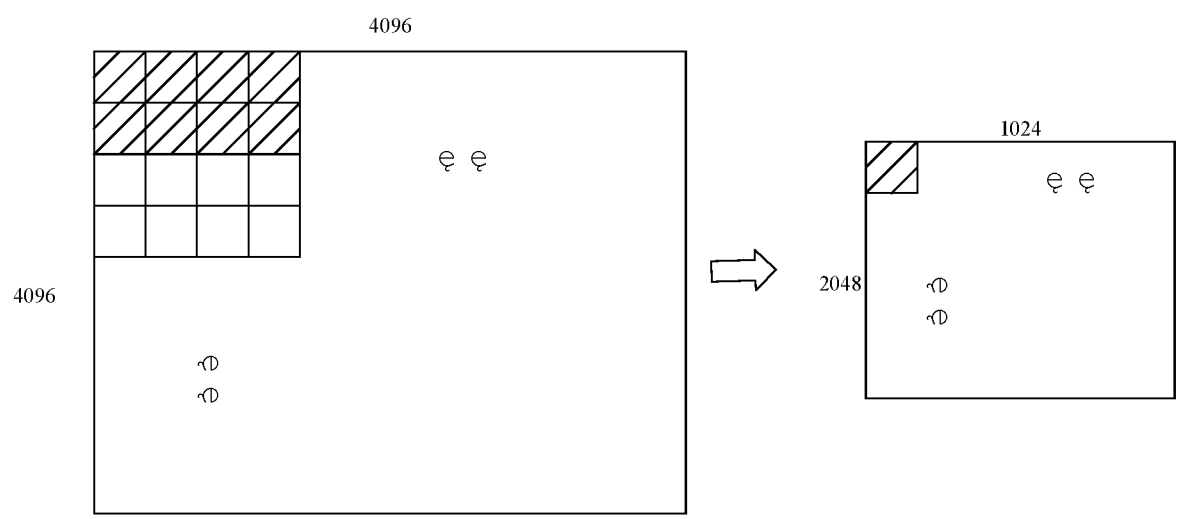

It is assumed that one frame of image contains 4096*4096 pieces of pixel data, as shown in FIG. 7D (where each square represents one piece of pixel data). When each of m and n has a value of 2, four pieces of adjacent pixel data in the pixels of the one frame of image may be combined into one piece of pixel data, resulting in 2048*2048 pieces of compressed pixel data, as shown in FIG. 7E (where the four hatched squares on the left represent four pieces of adjacent pixel data, and the one hatched square on the right represents one piece of pixel data obtained by combining the four pieces of adjacent pixel data). When n has a value of 2 and m has a value of 4, eight pieces of adjacent pixel data in the pixels of the one frame of image may be combined into one piece of pixel data, resulting in 2048*1024 pieces of compressed pixel data, as shown in FIG. 7F (where the eight hatched squares on the left represent eight pieces of adjacent pixel data, and the one hatched square on the right represents one piece of pixel data obtained by combining the eight pieces of adjacent pixel data).

In some embodiments of the present disclosure, a plurality of pieces of pixel data may be combined into one piece of pixel data by using any of the following schemes.

Figure 7G:
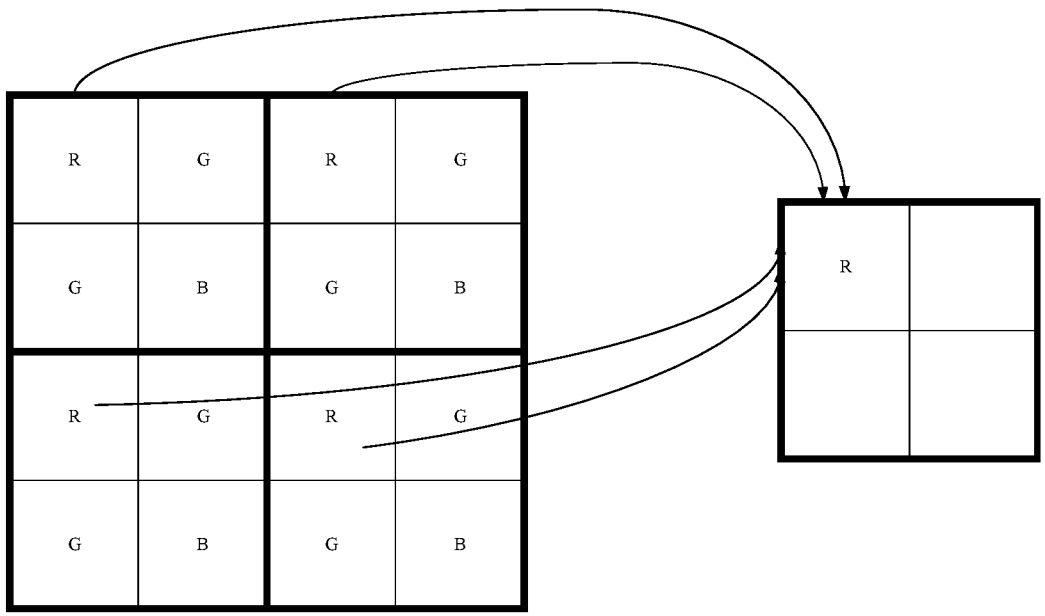
FIG. 7G is a schematic diagram showing combination of a plurality of pieces of pixel data into one according to some embodiments of the present disclosure.

In Scheme 1, an average of values of the plurality of pieces of pixel data may be calculated to obtain a value of the resulting one piece of pixel data. For example, each piece of pixel data may include four values, R, G, G and B. In this case, an average of the R values of the plurality of pieces of pixel data may be calculated as an R value of the resulting one piece of pixel data; an average of the G values of the plurality of pieces of pixel data may be calculated as a G value of the resulting one piece of pixel data; and so on. FIG. 7G is a schematic diagram showing four pieces of pixel data combined into one piece of pixel data. Each bold black box represents one piece of pixel data. Each piece of pixel data includes four values, R, G, G and B. Four pieces of adjacent pixel data are shown on the left and one piece of pixel data obtained by combining the four pieces of adjacent pixel data is shown on the right. The R value of the resulting one piece of data may be an average of the R values of the four pieces of adjacent pixel data, and the same also applies to other values.

In Scheme 2, a sum of values of the plurality of pieces of pixel data may be calculated to obtain a value of the resulting one piece of pixel data. For example, each piece of pixel data may include four values, R, G, G and B. In this case, a sum of the R values of the plurality of pieces of pixel data may be calculated as an R value of the resulting one piece of pixel data; a sum of the G values of the plurality of pieces of pixel data may be calculated as a G value of the resulting one piece of pixel data; and so on.

The above Scheme 1 is applicable in an environment having a good lighting condition, while the above Scheme 2 is applicable in a dark environment. In an embodiment of the present disclosure, Scheme 1 or Scheme 2 may be used for combining the plurality of pieces of pixel data depending on the operating environment of the camera. For example, Scheme 1 may be used for combining the plurality of pieces of pixel data in an environment having a good lighting condition, or Scheme 2 may be used for combining the plurality of pieces of pixel data in a dark environment. It may be set as desired by those skilled in the art and the present disclosure is not limited to this.

By combining the pixel data, the amount of data to be transmitted may be reduced and, additionally, in a low illumination situation, by accumulating values of a plurality of pieces of pixel data using Scheme 2, a quantum conversion rate of one single piece of pixel data may be increased effectively, such that the sensitivity of the pixel data may be improved. In a normal illumination situation, by summing and averaging a plurality of pieces of adjacent pixel data using Scheme 1, the detail information of the image may be kept, without causing overflow of pixel values.

Embodiment 2

According to Embodiment 2 of the present disclosure, a method for image capturing control is provided. The method is applicable to an image capturing controller (e.g., Field-Programmable Gate Array (FPGA), Central Processing Unit (CPU) or microprocessor). As shown in the flowchart of FIG. 8, the method includes the following steps.

At step 201, a position region in which a target object is to be located in a next frame of image is predicted based on an object tracking result associated with a previous frame of image, and the position region is determined as a target ROI corresponding to the next frame of image.

At step 202, ROI information of the target ROI corresponding to the next frame of image is transmitted to a camera.

Figure 8:
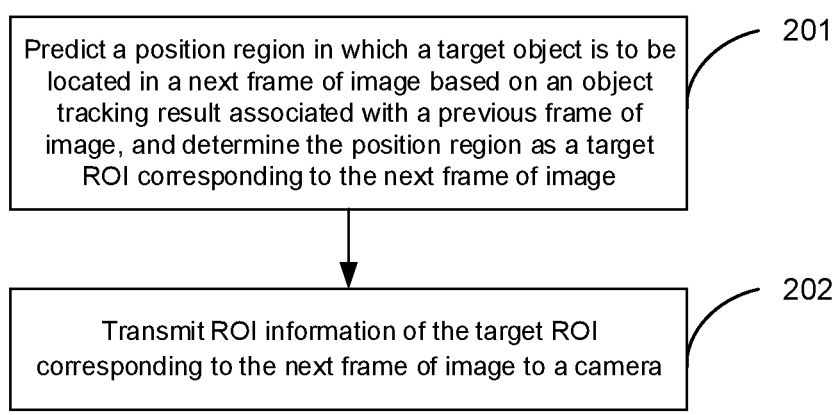
FIG. 8 is a first flowchart illustrating a method for image capturing control according to some embodiments of the present disclosure.
Figure 9:
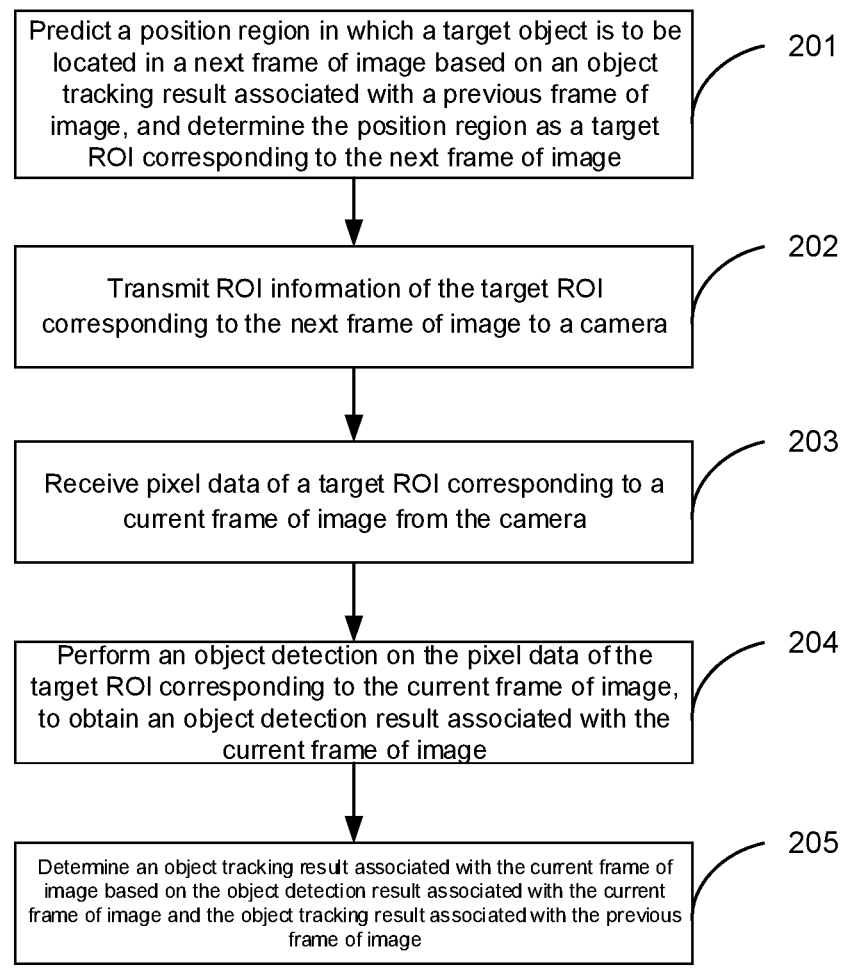
FIG. 9 is another flowchart illustrating a method for image capturing control according to some embodiments of the present disclosure.

In some embodiments, the method process shown in FIG. 8 may further include steps 203-205, as shown in FIG. 9.

At step 203, pixel data of a target ROI corresponding to a current frame of image is received from the camera.

At step 204, an object detection is performed on the pixel data of the target ROI corresponding to the current frame of image, to obtain an object detection result associated with the current frame of image.

At step 205, an object tracking result associated with the current frame of image is determined, based on the object detection result associated with the current frame of image and the object tracking result associated with the previous frame of image.

Figure 10A:
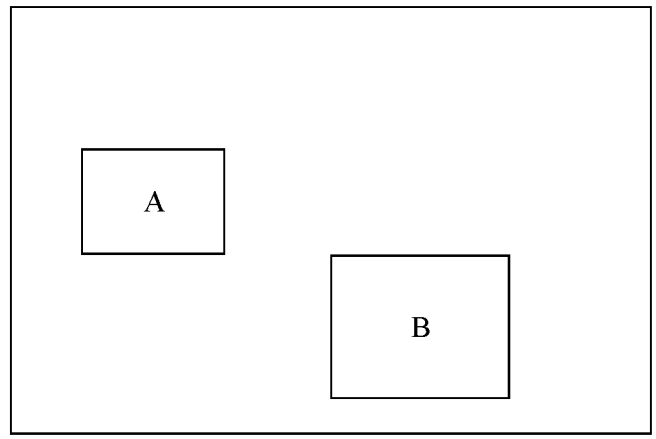
FIG. 10A is a schematic diagram showing an object tracking result associated with a previous frame of image according to some embodiments of the present disclosure.
Figure 10B:
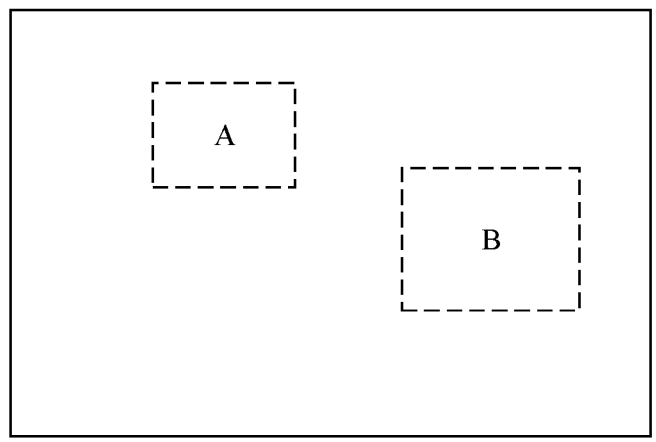
FIG. 10B is a schematic diagram showing a target ROI corresponding to a next frame of image according to some embodiments of the present disclosure.

In some embodiments of the present disclosure, in the step 201, an existing object tracking algorithm may be used to predict the position region in which each target object is to be located in the next frame of image, based on the object tracking result associated with the previous frame of image. The present disclosure is not limited to any specific implementation of the step 201. FIG. 10A shows the to object tracking result associated with the previous frame of image (assuming that Object A and Object B are included). FIG. 10B shows the position regions (shown as dashed boxes) of the respective target objects in the next frame of image as predicted based on the object tracking result associated with the previous frame of image. The position regions are determined as target ROIs corresponding to the next frame of image.

In some embodiments of the present disclosure, the ROI information contains information describing the position region in which the ROI is located in the frame of image. For this, reference may be made to the relevant description in the above Embodiment 1 and details thereof will be omitted here.

In some embodiments of the present disclosure, in the step 204, an existing object detection algorithm may be used to obtain the object detection result associated with the current frame of image. The present disclosure is not limited to any specific implementation of the step 204.

Figure 11A:
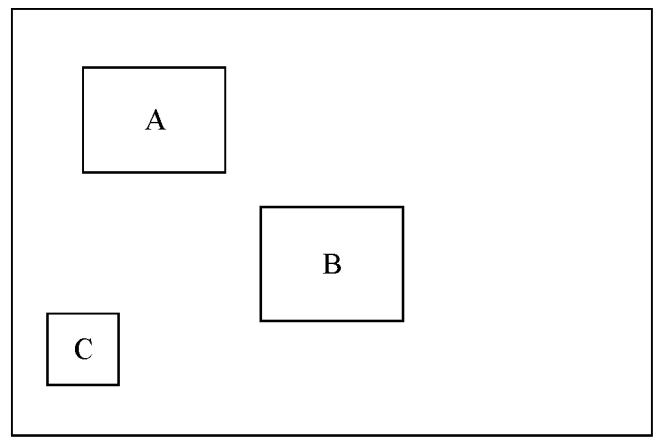
FIG. 11A is a schematic diagram showing an object detection result associated with a current frame of image according to some embodiments of the present disclosure.
Figure 11B:
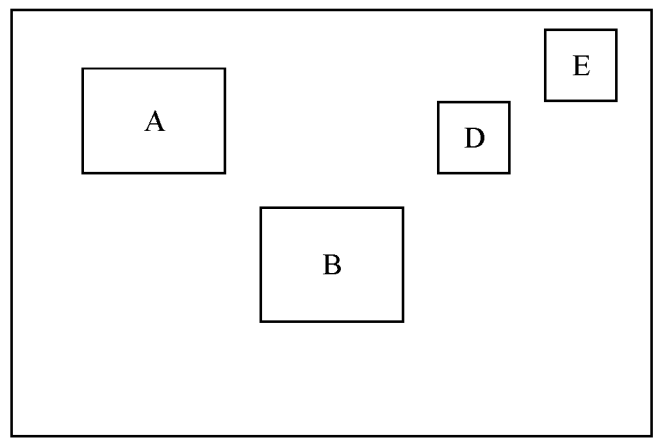
FIG. 11B is a schematic diagram showing an object tracking result associated with a previous frame of image according to some embodiments of the present disclosure.
Figure 11C:
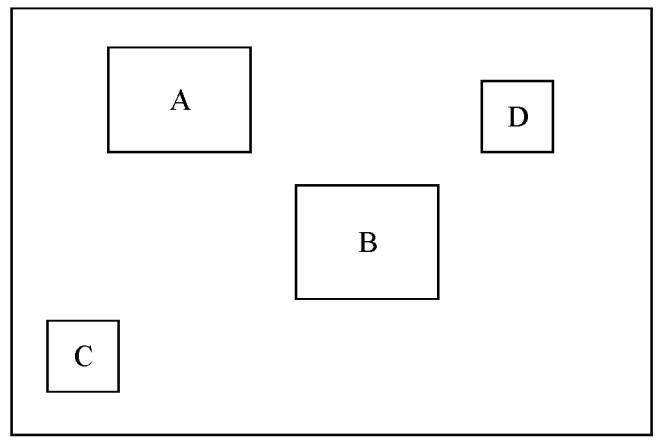
FIG. 11C is a schematic diagram showing an object tracking result associated with a current frame of image according to some embodiments of the present disclosure.

In particular, the step 205 may be implemented as follows. The object detection result associated with the current frame of image (the target object contained is referred to as detection target) is matched with the object tracking result associated with the previous frame of image (the target object contained is referred to as tracking target), to obtain the matched tracking target and detection target, or the unmatched tracking target and detection target. The matched tracking target is processed with Kalman filter and feature fusion and then included in a preconfigured set, T_1. The unmatched tracking target is predicted with Kalman filter or removed, to obtain a set, T_2. The unmatched detection target is included in a preconfigured set, T_3. The union of the sets T_1, T_2 and T_3 is determined as the object tracking result associated with the current frame of image. FIG. 11A shows the object detection result associated with the current frame of image (including detection targets A, B and C). FIG. 11B shows the object tracking result associated with the previous frame of image (including tracking targets A, B, D and E). FIG. 11C shows the object tracking result associated with the current frame of image (including tracking targets A, B, C and D).

Of course, in the above step 205, the object tracking result associated with the current frame of image may be obtained by those skilled in the art using any existing object tracking techniques. The present disclosure is not limited to any specific object tracking technique.

Embodiment 3

Figure 12:
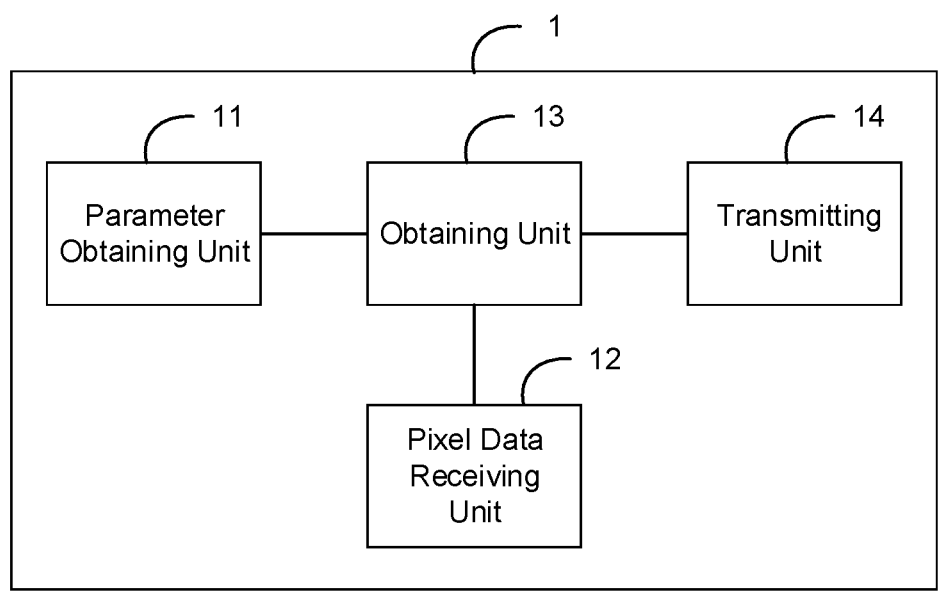
FIG. 12 is a schematic diagram showing a structure of an apparatus for image capturing according to some embodiments of the present disclosure.

Based on the same concept as the method for image capturing according to the above Embodiment 1, in an embodiment of the present disclosure, an apparatus for image capturing is also provided. The apparatus 1 for image capturing is applicable to a camera. Referring to the structure shown in FIG. 12, the apparatus 1 for image capturing includes the following units.

A parameter obtaining unit 11 is configured to obtain ROI information of a target ROI corresponding to a current frame of image.

A pixel data receiving unit 12 is configured to buffer captured pixel data of the current frame of image.

An obtaining unit 13 is configured to obtain, when determining that the pixel data of the current frame of image has been buffered completely, pixel data associated with the target ROI from the buffered pixel data of the current frame of image based on the ROI information if the ROI information of the target ROI corresponding to the current frame of image may be obtained from the parameter obtaining unit 11, and transmit the pixel data associated with the target ROI to a transmitting unit 14.

The transmitting unit 14 is configured to output the pixel data associated with the target ROI.

In some embodiments, the obtaining unit 13 may be configured to obtain the pixel data associated with the target ROI from the buffered pixel data of the current frame of image based on the ROI information by: determining the pixel data associated with the target ROI in the pixel data of the current frame of image based on the ROI information; determining a storage address of the pixel data associated with the target ROI in a buffer; and reading the pixel data from the storage address to obtain the pixel data associated with the target ROI.

In some embodiments, the obtaining unit 13 may be further configured to, if the ROI information of the target ROI corresponding to the current frame of image cannot be obtained from the parameter obtaining unit 11: combine n*m pieces of adjacent pixel data in the pixel data of the current frame of image into one piece of pixel data sequentially, to obtain compressed pixel data associated with the current frame of image, and transmit the compressed pixel data to the transmitting unit 14, where n is a natural number divisible by a total number of rows in the current frame of image, and m is a natural number divisible by a total number of columns in the current frame of image. Accordingly, the transmitting unit 14 may be further configured to output the compressed pixel data associated with the current frame of image.

In some embodiments of the present disclosure, for the specific implementation of the obtaining unit 13, reference may be made to the above description relevant to the steps 104 and 105 in Embodiment 1, and details thereof will be omitted here.

Embodiment 4

Figure 13:
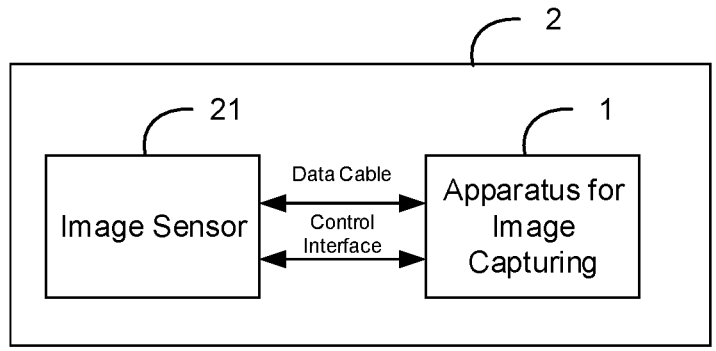
FIG. 13 is a schematic diagram showing a structure of a camera according to some embodiments of the present disclosure.

According to Embodiment 4 of the present disclosure, a camera is provided. Referring to the structure shown in FIG. 13, the camera 2 may include: an image sensor 21 configured to capture pixel data of a current frame of image in accordance with a predetermined camera parameter and transmit the captured pixel data to an apparatus 1 for image capturing; and the apparatus 1 for image capturing configured to obtain ROI information of a target ROI corresponding to the current frame of image; receive the pixel data of the current frame of image from the image sensor 21 and buffer the pixel data; obtain, when determining that the pixel data of the current frame of image has been buffered completely, pixel data associated with the target ROI from the buffered pixel data of the current frame of image based on the ROI information if the ROI information of the target ROI corresponding to the current frame of image may be obtained; and output the pixel data associated with the target ROI.

In some embodiments, the apparatus 1 for image capturing may be further configured to, if the ROI information of the target ROI corresponding to the current frame of image cannot be obtained: combine n*m pieces of adjacent pixel data in the pixel data of the current frame of image into one piece of pixel data sequentially, to obtain compressed pixel data associated with the current frame of image, and output the compressed pixel data, where n is a natural number divisible by a total number of rows in the current frame of image, and m is a natural number divisible by a total number of columns in the current frame of image.

The apparatus 1 for image capturing may continuously receive the pixel data transmitted from the image sensor 21 in accordance with an interface timing sequence, and buffer the received pixel data in a preconfigured storage space with the resolution of the image sensor 21 in accordance with row/column information in the timing sequence.

In Embodiment 4 of the present disclosure, for the apparatus 1 for image capturing, reference may be made to relevant description in Embodiment 3 and details thereof will be omitted here.

Embodiment 5

Based on the same concept as the method for image capturing control according to the above Embodiment 2, in an embodiment of the present disclosure, an apparatus for image capturing control is provided. The apparatus 3 for image capturing control is applicable to an image capturing controller (e.g., FPGA, CPU or microprocessor). Referring to the structure shown in FIG. 14, the apparatus 3 for image capturing control includes the following units.

An ROI determining unit 31 is configured to predict a position region in which a target object is to be located in a next frame of image based on an object tracking result associated with a previous frame of image, and determine the position region as a target ROI corresponding to the next frame of image.

A transmitting unit 32 is configured to transmit ROI information of the target ROI corresponding to the next frame of image to a camera.

Figure 14:
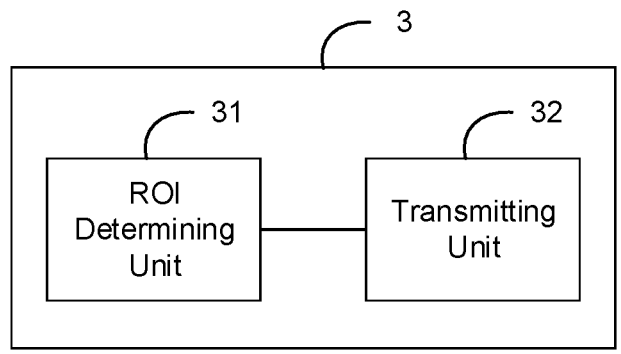
FIG. 14 is a schematic diagram showing a structure of an apparatus for image capturing control according to some embodiments of the present disclosure.
Figure 15:
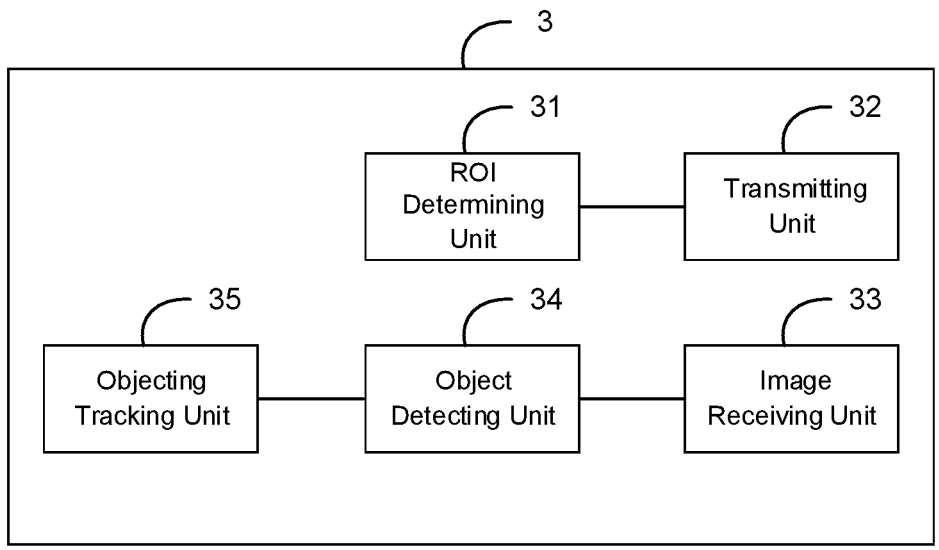
FIG. 15 is another schematic diagram showing a structure of an apparatus for image capturing control according to some embodiments of the present disclosure.

In some embodiments, the apparatus 3 for image capturing control as shown in FIG. 14 may further include an image receiving unit 33, an object detecting unit 34 and an object tracking unit 35, as shown FIG. 15.

The image receiving unit 33 is configured to receive pixel data of a target ROI corresponding to a current frame of image from the camera.

The object detecting unit 34 is configured to perform an object detection on the pixel data of the target ROI corresponding to the current frame of image, to obtain an object detection result associated with the current frame of image.

The object tracking unit 35 is configured to determine an object tracking result associated with the current frame of image based on the object detection result associated with the current frame of image and the object tracking result associated with the previous frame of image.

In Embodiment 5 of the present disclosure, the object detecting unit 34 may use an existing object detection technique to perform the object detection on the pixel data of the target ROI, and details thereof will be omitted here.

In Embodiment 5 of the present disclosure, the object tracking unit 35 may use an existing object tracking technique to obtain the object tracking result associated with the current frame of image, or may perform the object tracking using the scheme described above in connection with the step 205 in Embodiment 2, and details thereof will be omitted here.

Embodiment 6

Figure 16:
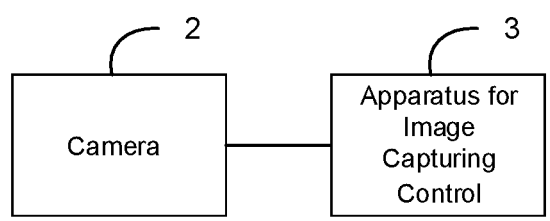
FIG. 16 is a schematic diagram showing a structure of a system for image capturing according to some embodiments of the present disclosure.

According to Embodiment 6 of the present disclosure, a system for image capturing is provided. The system for image capturing includes a camera 2 and an apparatus 3 for image capturing control, as shown in FIG. 16.

The apparatus 3 for image capturing control is configured to predict a position region in which a target object is to be located in a next frame of image based on an object tracking result associated with a previous frame of image, and determine the position region as a target ROI corresponding to the next frame of image; and transmit ROI information of the target ROI corresponding to the next frame of image to the camera 2.

The camera 2 is configured to obtain ROI information of a target ROI corresponding to a current frame of image from the apparatus 3 for image capturing control; capture pixel data of the current frame of image in accordance with a predetermined camera parameter and buffer the pixel data of the current frame of image; obtain, when determining that the pixel data of the current frame of image has been buffered completely, pixel data associated with the target ROI from the buffered pixel data of the current frame of image based on the ROI information if the ROI information of the target ROI corresponding to the current frame of image may be obtained; and output the pixel data associated with the target ROI.

In some embodiments, the camera 2 may be further configured to, if the ROI information of the target ROI corresponding to the current frame of image cannot be obtained: combine n*m pieces of adjacent pixel data in the pixel data of the current frame of image into one piece of pixel data sequentially, to obtain compressed pixel data associated with the current frame of image, and output the compressed pixel data, where n is a natural number divisible by a total number of rows in the current frame of image, and m is a natural number divisible by a total number of columns in the current frame of image.

In Embodiment 6 of the present disclosure, for the specific structure of the apparatus 3 for image capturing control, reference may be made to Embodiment 5 and details thereof will be omitted here. For the specific structure of the camera 2, reference may be made to Embodiment 4 and details thereof will be omitted here.

In an embodiment of the present disclosure, an image data transmission protocol may be agreed in advance between the apparatus for image capturing in the camera 2 and the apparatus for image capturing control. Information on the format to be used by the apparatus for image capturing for transmitting pixel data of a target ROI corresponding to a frame of image to the apparatus for image capturing control may be specified in the protocol. For example, when a frame of image corresponds to one piece of image data, the information on the format may specify which fields are included in the one piece of image data and the order thereof. For example, one piece of image data may include the following three fields sequentially: a field for indicating statement information of starting transmission of the current frame of image, a field for describing a number of target ROIs contained in the current frame of image, and a field containing pixel data of all the target ROIs corresponding to the current frame of image.

The basic principles of the present disclosure have been described above with reference to the embodiments. However, it may be appreciated by those skilled in the art that all or any of the steps or components of the method or apparatus according to the present disclosure may be implemented in hardware, firmware, software or any combination thereof in any computing device (including a processor, a storage medium, etc.) or a network of computing devices. This may be achieved by those skilled in the art using their basic programing skills based on the description of the present disclosure.

It may be appreciated by those skilled in the art that all or part of the steps in the method according to the above embodiment may be implemented in hardware following instructions of a program. The program may be stored in a computer readable storage medium. The program, when executed, may include one or any combination of the steps in the method according to the above embodiment.

Further, the functional units in the embodiments of the present disclosure may be integrated into one processing module or may be physically separate, or two or more units may be integrated into one module. Such integrated module may be implemented in hardware or software functional units. When implemented in software functional units and sold or used as a standalone product, the integrated module may be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the embodiments of the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for image capturing, comprising:
    obtaining Region Of Interest (ROI) information of a target ROI corresponding to a current frame of image;
    buffering captured pixel data of the current frame of image;
    obtaining, when determining that the pixel data of the current frame of image has been buffered completely, pixel data associated with the target ROI from the buffered pixel data of the current frame of image based on the ROI information if the ROI information of the target ROI corresponding to the current frame of image can be obtained;
    outputting the pixel data associated with the target ROI; and
    subsequent to determining that the pixel data of the current frame of image has been buffered completely, if the ROI information of the target ROI corresponding to the current frame of image cannot be obtained, combining n*m pieces of adjacent pixel data in the pixel data of the current frame of image into one piece of pixel data sequentially, to obtain compressed pixel data associated with the current frame of image, and outputting the compressed pixel data, where n is a natural number divisible by a total number of rows in the current frame of image, and m is a natural number divisible by a total number of columns in the current frame of image.

2. The method of claim 1, wherein said obtaining the pixel data associated with the target ROI from the buffered pixel data of the current frame of image based on the ROI information comprises:
    determining the pixel data associated with the target ROI in the pixel data of the current frame of image based on the ROI information;
    determining a storage address of the pixel data associated with the target ROI in a buffer; and
    reading the pixel data from the storage address to obtain the pixel data associated with the target ROI.

3. An apparatus for image capturing, comprising:
    a parameter obtaining unit configured to obtain Region Of Interest (ROI) information of a target ROI corresponding to a current frame of image;
    a pixel data receiving unit configured to buffer captured pixel data of the current frame of image;
    an obtaining unit configured to obtain, when determining that the pixel data of the current frame of image has been buffered completely, pixel data associated with the target ROI from the buffered pixel data of the current frame of image based on the ROI information if the ROI information of the target ROI corresponding to the
    current frame of image can be obtained from the parameter obtaining unit, and transmit the pixel data associated with the target ROI to a transmitting unit; and
    the transmitting unit configured to output the pixel data associated with the target ROI, wherein the obtaining unit is further configured to, if the ROI information of the target ROI corresponding to the current frame of image cannot be obtained from the parameter obtaining unit: combine n*m pieces of adjacent pixel data in the pixel data of the current frame of image into one piece of pixel data sequentially, to obtain compressed pixel data associated with the current frame of image, and transmit the compressed pixel data to the transmitting unit, where n is a natural number divisible by a total number of rows in the current frame of image, and m is a natural number divisible by a total number of columns in the current frame of image, and
    the transmitting unit is further configured to output the compressed pixel data associated with the current frame of image.

4. The apparatus of claim 3, wherein the obtaining unit is configured to obtain the pixel data associated with the target ROI from the buffered pixel data of the current frame of image based on the ROI information by:
    determining the pixel data associated with the target ROI in the pixel data of the current frame of image based on the ROI information;
    determining a storage address of the pixel data associated with the target ROI in a buffer; and
    reading the pixel data from the storage address to obtain the pixel data associated with the target ROI.

5. A camera, comprising:
    an image sensor configured to capture pixel data of a current frame of image in accordance with a predetermined camera parameter and transmit the captured pixel data to an apparatus for image capturing; and
    the apparatus for image capturing configured to obtain Region Of Interest (ROI) information of a target ROI corresponding to the current frame of image is configured to:

receive the pixel data of the current frame of image from the image sensor and buffer the pixel data;

obtain, when determining that the pixel data of the current frame of image has been buffered completely, pixel data associated with the target ROI from the buffered pixel data of the current frame of image based on the ROI information if the ROI information of the target ROI corresponding to the current frame of image can be obtained;

output the pixel data associated with the target ROI; and if the ROI information of the target ROI corresponding to the current frame of image cannot be obtained:

combine n*m pieces of adjacent pixel data in the pixel data of the current frame of image into one piece of pixel data sequentially, to obtain compressed pixel data associated with the current frame of image, and output the compressed pixel data, where n is a natural number divisible by a total number of rows in the current frame of image, and m is a natural number divisible by a total number of columns in the current frame of image.

6. A system for image capturing, comprising:

an apparatus for image capturing control configured to
predict a position region in which a target object is to be located in a next frame of image based on an object tracking result associated with a previous frame of image, and
determine the position region as a target Region of Interest (ROI) corresponding to the next frame of image; and transmit ROI information of the target ROI corresponding to the next frame of image to a camera; and the camera configured to obtain ROI information of a target ROI corresponding to a current frame of image from the apparatus for image capturing control;

capture pixel data of the current frame of image in accordance with a predetermined camera parameter and buffer the pixel data of the current frame of image;

obtain, when determining that the pixel data of the current frame of image has been buffered completely, pixel data associated with the target ROI from the buffered pixel data of the current frame of image based on the ROI information if the ROI information of the target ROI corresponding to the current frame of image can be obtained; and output the pixel data associated with the target ROI, wherein the camera is further configured to, if the ROI information of the target ROI corresponding to the current frame of image cannot be obtained:

combine n*m pieces of adjacent pixel data in the pixel data of the current frame of image into one piece of pixel data sequentially, to obtain compressed pixel data associated with the current frame of image, and output the compressed pixel data, where n is a natural number divisible by a total number of rows in the current frame of image, and m is a natural number divisible by a total number of columns in the current frame of image.

* * * * *